BAIL-TYPE ANCHOR DEVICE FOR A HOLLOW ROCK BOLT

Original Filed June 25, 1965

INVENTOR
CHESTER I. WILLIAMS
BY
Glenn B. Morris
ATT'Y

United States Patent Office

Re. 26,762
Reissued Jan. 13, 1970

26,762
BAIL-TYPE ANCHOR DEVICE FOR A HOLLOW ROCK BOLT

Chester I. Williams, 347 Greenbriar SE.,
Grand Rapids, Mich. 49502

Original No. 3,324,756, dated June 13, 1967, Ser. No. 466,946, June 25, 1965. Application for reissue July 12, 1968, Ser. No. 750,378
Int. Cl. F16b *13/04*
U.S. Cl. 85—75 3 Claims

Matter enclosed in heavy brackets [ ] appears in the original patent but forms no part of this reissue specification; matter printed in italics indicates the additions made by reissue.

*ABSTRACT OF THE DISCLOSURE*

*An externally threaded hollow bolt rod and anchoring device having an internally threaded wedge nut threaded onto the rod and adapted to move axially of the rod and radially expand a pair of bearing members. The bearing members are connected by a centrally apertured bail member extending over the end of the hollow bolt so that the aperture in the bail and bore through the hollow bolt are in alignment.*

This invention relates to the construction of a particular type of anchor device used in conjunction with rock bolts. This form of anchor usually includes a wedge-shaped or conical member in threaded engagement with the inner end of the bolt, and a pair of separable bearing members on opposite sides of the bolt. As the rod is rotated relative to the anchor device, the wedge moves axially between the bearing portions and increases the circumscribed diameter around them to generate a clamping action against the wall of a hole drilled in the rock formation. It is conventional to interconnect these bearing members with a deformable piece extending over the end of the bolt rod. The shape of this piece has given rise to the name "bail-type" to describe this form of anchor. As the bearing portions separate *and* come into engagement with the wall of the rock formation, the interconnecting bail will deflect to accommodate this movement. The primary purpose of the bail is to maintain the axial position of the bearing members with respect to the bolt rod at least temporarily so that the wedge can move between them to generate the clamping action.

Hollow rock bolts have been a very useful development, and have permitted the interior of the bolt to function either as a vent hole for the withdrawal of air from the hole in the rock formation as grout is injected near the surface; or, alternatively, to function as a conduit for the grout in cases in which the venting must be done near the surface. The latter case corresponds to situations in which the hole is drilled at a downward angle from the surface, and the former corresponds to overhead installations. Bail-type anchor devices have not been practical in conjunction with hollow rock bolts, in view of the tendency for the bail to obstruct the central bore of the rock bolt so that it cannot adequately function either as a vent or as a grout conduit. The present invention constitutes an improvement in the construction of this type of anchor device so that the conduit aspects of a hollow bolt may be maintained without interfering with the functioning or installation of the anchor device. This improvement centers in a modification of the bail portion of the anchor to provide a passage communicating between the hollow interior of the bolt rod and the surrounding space. The several features of the invention will be analyzed in detail through a discussion of the embodiments illustrated in the accompanying drawing. In the drawing:

Figure 1:
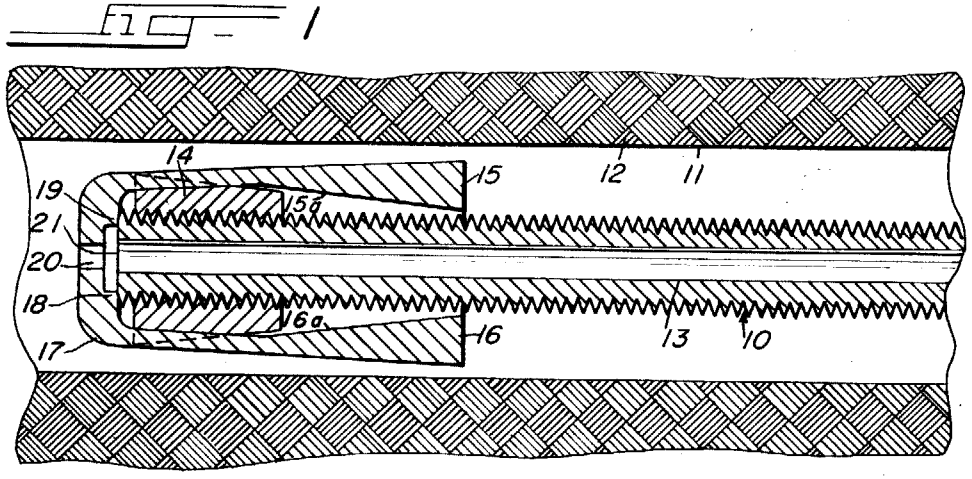
FIGURE 1 is a sectional elevation showing a rock bolt with a bail-type anchor device installed in a hole in a rock formation, with the components of the device in the unexpanded condition.

The hollow rock bolt 10 is shown installed in the hole 11 in the rock formation 12. The passage 13 through the interior of the rock bolt may be used either to vent air out of the hole 11, or as a conduit for grout. The anchor device for securing the bolt with respect to the surrounding rock formation 12 includes the wedge member 14 in threaded engagement with the bolt rod 10, and the bearing members 15 and 16. These members are disposed [in] *on* opposite sides of the bolt rod, and the wedge 14 is interposed between them. Preferably, the inner surfaces 15a and 16a of the bearing members are tapered in conformity with the tapered outer surface of the wedge member to maintain approximate parallelism of the bearing members as expansion proceeds.

The bearing members 15 and 16 are interconnected by the bail portion 17. Preferably, the wedge is provided with grooves on its opposite sides that register with the bail 17 as shown to maintain the rotative alignment of the wedge with respect to the bearing members 15 and 16. The anchor device thus far described is conventional.

To provide for continuity of the passage established by the bore 13 in the bolt rod, the bail 17 is provided with shoulders as shown at 18 and 19, and with the central hole 20. The presence of the shoulders 18 and 19 establishes a spaced relationship between the central portion of the bail and the end 21 of the bolt rod, thus establishing a passage extending laterally in opposite directions in communication with the bore 13. The hole 20 supplements this function by providing a coaxial passage, and it is preferable that both of these arrangements be included. Either one of these, however, will serve the purpose. The joint lateral and coaxial passages, however, have a tendency to provide a better discharge of grout, and also minimize the possibility that the passage might become blocked by rock chips or other such material. The hole 20 should be slightly smaller than the bore 13 of the rock bolt to minimize the possibility that a piece of material might enter into the hole 20, and thus operate as a valve closing off the end of the hollow rock bolt.

Figure 2:
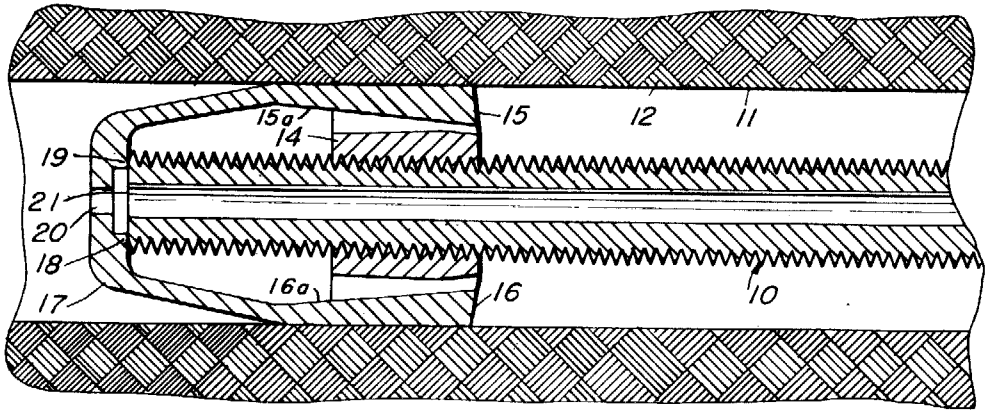
FIGURE 2 is a section similar to FIGURE 1, showing the actuated condition of the components of the anchor device, with the bearing members forced against the wall of the hole in the rock formation by the wedge member.

The setting and functioning of the anchor device are not altered in any way by the improvement described above. When the unit has reached the "set" position shown in FIGURE 2, grout may be injected through the bore 13 without obstruction, or the hollow bolt rod may function as a vent tube to withdraw air from a point near the surface.

[The particular embodiments of the present invention which have been illustrated and discussed herein are for illustrated purposes only and are not to be considered as a limitation upon the scope of the appended claims. In these claims, it is my intent to claim the entire invention disclosed herein, except as I am limited by the prior art.]

I claim:

1. In an assembly including a hollow bolt rod and an anchor device having separable portions on opposite sides of said bolt rod interconnected by a bail member extending over the end of said bolt rod, and also including a wedge in threaded engagement with said bolt rod and interposed between said separable portions, the improvement comprising means forming a pair of internal shoulders on said bail member normally engaging the opposite sides of the end of said bolt rod, respectively, and providing a central portion on said bail member spaced axially from said shoulders beyond the end of said bolt rod, said central portion having a hole therethrough coaxially with said bolt rod, said hole and spaced central portion providing passages communicating with the interior of said bolt rod.

2. The improvement defined in claim 1, wherein said hole is smaller in diameter than the inside diameter of said bolt rod.

*3. In a groutable rock bolt assembly including a hollow bolt rod having an internal passage extending to the inner end thereof, and an anchor device having separable portions on opposite sides of said bolt rod interconnected by a deflectible bail member of greater width than said passage and extending over and normally bearing against the said end, and also including a wedge in threaded engagement with said bolt rod and interpose between said separable portions, said wedge being operable to separate said portions on axial movement away from said end, said bail member tending to maintain the axial position of said portions with respect to said bolt rod, the improvement comprising:*

*means forming an aperture in said bail in substantial*

*alignment with said passage and forming a continuation thereof.*

References Cited

The following references, cited by the Examiner, are of record in the patented file of this patent or the original patent.

UNITED STATES PATENTS

| | | | |
|---|---|---|---|
| 2,667,037 | 1/1954 | Thomas et al. | 85—84 |
| 3,065,659 | 11/1962 | Eriksson et al. | 85—67 |
| 3,200,693 | 8/1965 | Dickow | 85—75 |
| 3,236,146 | 2/1966 | Teeple | 85—76 |
| 3,247,754 | 4/1966 | Bieser | 85—73 |
| 1,050,345 | 1/1913 | Conrad | 85—74 |

FOREIGN PATENTS

| | | |
|---|---|---|
| 68,518 | 11/1957 | France. |
| 1,327,260 | 4/1963 | France. |

MARION PARSONS, Jr., Primary Examiner